(12) United States Patent
Jagiella et al.

(10) Patent No.: US 7,187,191 B2
(45) Date of Patent: Mar. 6, 2007

(54) SENSOR DEVICE FOR DETERMINING THE LAYER THICKNESS OF A THIN LAYER

(75) Inventors: Manfred Jagiella, Notzingen (DE); Sorin Fericean, Leonberg (DE)

(73) Assignee: Balluff GmbH, Neuhausen (DE)

( * ) Notice: Subject to any disclaimer, the term of this patent is extended or adjusted under 35 U.S.C. 154(b) by 341 days.

(21) Appl. No.: 10/411,596

(22) Filed: Apr. 10, 2003

(65) Prior Publication Data

US 2003/0193346 A1 Oct. 16, 2003

(30) Foreign Application Priority Data

Apr. 16, 2002 (DE) ................... 102 17 535

(51) Int. Cl.
*G01R 31/26* (2006.01)
(52) U.S. Cl. ..................................... 324/765
(58) Field of Classification Search ............. 324/158.1, 324/766, 230, 763, 239, 755, 236
See application file for complete search history.

(56) References Cited

U.S. PATENT DOCUMENTS 5,781,008 A * 7/1998 Muller et al. ............... 324/230

6,822,440 B2 * 11/2004 Machul ................. 324/207.12

FOREIGN PATENT DOCUMENTS

| DE | 195 38 575 | 6/1997 |
|---|---|---|
| DE | 199 49 977 | 5/2001 |
| DE | 100 00 730 | 7/2001 |

OTHER PUBLICATIONS

Brochure of Fischer, "Fischerscope MMS", *Universal-Messsystem fur Schichtdicken und Werkstoffeigenschaften*, date unknown.

* cited by examiner

*Primary Examiner*—Jermele Hollington
*Assistant Examiner*—Trung Q. Nguyen
(74) *Attorney, Agent, or Firm*—Lipsitz & McAllister LLC

(57) ABSTRACT

To provide a sensor device for determining the layer thickness of a thin layer of an electrically conducting or semi-conducting material which can be used in a simple and low-cost way, it is proposed that the said sensor device comprises one or more inductive proximity sensors which can be positioned at a distance from the layer, an inductive proximity sensor having an oscillator with a frequency which is adapted with respect to the material and the thickness range of the layer to be measured.

32 Claims, 3 Drawing Sheets

SENSOR DEVICE FOR DETERMINING THE LAYER THICKNESS OF A THIN LAYER

The present disclosure relates to the subject matter disclosed in German application No. 102 17 535.7 of Apr. 16, 2002, which is incorporated herein by reference in its entirety and for all purposes.

BACKGROUND OF THE INVENTION

The invention relates to a sensor device for determining the layer thickness of a thin layer of an electrically conducting or semiconducting material.

Such sensor devices are used if, for example, in the chemical-mechanical processing of a silicon wafer, the thickness of a copper film on the wafer has to be ascertained. The corresponding layers may in this case have a thickness of the order of magnitude of μm or less.

Measuring methods involving contact which can be used to ascertain layer thicknesses are known from the prior art. These include, for example, the eddy current method according to DIN EN ISO 2360, ASTM B244, the magneto-inductive method according to DIN EN ISO 2178, ASTM B499 and the magnetic method according to DIN EN ISO 2178. Ascertainment of the layer thickness by determining the electrical resistance of the layer is also a measuring method involving contact.

SUMMARY OF THE INVENTION

In accordance with the present invention, a sensor device for determining the layer thickness of a thin layer is provided which can be used in a simple and low-cost way.

This is achieved by the sensor device comprising one or more inductive proximity sensors which can be positioned at a distance from the layer, an inductive proximity sensor comprising an oscillator with a frequency which is adapted with respect to the material and the thickness of the layer to be measured.

It has been found that, with inductive proximity sensors, layer thicknesses of, in particular, metallic layers which are disposed on an electrically non-conducting carrier can be determined with good accuracy if the frequency of the oscillator of the proximity sensor is correspondingly adapted. The alternating electromagnetic field of the inductive proximity sensor has the effect of inducing eddy currents in the layer as a damping material, extracting energy from the field. As a result, the oscillator of the proximity sensor is damped and its oscillation amplitude is reduced. The corresponding change is then evaluated. If the oscillator is operated in resonance and a variation of the oscillation amplitude caused by damping is correspondingly ascertained (quality or Q circuit), tests have shown that layer thicknesses of the order of magnitude of μm and less can be determined contact-free.

Since the measurement does not involve contact, such layer thicknesses can also be ascertained during the processing of the layer itself.

In particular, a corresponding sensor device then allows control of the processing of a corresponding layer to be realized.

In particular, the distance from a support for the layer is kept constant during the measurement, that is to say this distance is not varied with respect to the support. As a result, the layer thickness can also be measured during processing of the layer, provided that the alternating electromagnetic field of the inductive proximity sensor is not modified by the processing tool.

The frequency of the oscillator or oscillators is advantageously kept constant during the measurement, in order in this way to avoid any influence of a change in frequency on the measurement.

In particular, the frequency of the oscillator is in this case at most high enough for the field generated by the oscillator to be able to penetrate the layer. This means that the frequency is chosen to be lower than a limit frequency, on the basis of which the field can only partially penetrate into the layer because of the skin effect. The frequency of the oscillator is then advantageously at most as high as the frequency at which the electromagnetic penetration depth (skin depth) corresponds to ⅓ of the layer thickness.

Furthermore, the frequency of the oscillator is at least high enough for good measuring sensitivity to be obtained. If the frequency is too low, the measuring sensitivity with respect to the layer thickness is reduced.

Furthermore, the frequency of the oscillator is at least high enough for the influence of the surroundings of the layer on the measurement result to be minimized. At frequencies which are too low, a large part of the alternating electromagnetic field penetrates through the layer and further influencing effects can occur on account of further objects positioned around the object being measured. By setting the frequency above a minimum value, such an influence can be minimized.

In particular, the frequency of the oscillator in this case lies in the range between 10 kHz and 100 MHz. Good results have been obtained using an inductive proximity sensor with an oscillator frequency of 1 MHz. In particular for copper layers with thicknesses in the μm range, frequencies of between about 0.5 MHz and 20 MHz are advantageous.

It can in this case be provided that an inductive proximity sensor is formed in such a way that its frequency can be adjusted. As a result, it can be adapted to the object being measured and, in particular, to the material of the layer to be measured and to the expected layer thickness range. The frequency can in this case be set by variation of the inductance and/or capacitance of the oscillator.

It may also be alternatively or additionally provided that an inductive proximity sensor is formed in such a way that an effective winding number of an oscillator inductance can be set. In an equivalent circuit model, in which the object being measured, with the layer, is regarded as having an internal resistance and an inductance of a specific number of windings, the influence of this object being measured can be considered by means of a modified resistance, connected in parallel, in the oscillator of an inductive proximity sensor. This equivalent resistance then depends on the turns ratio and the internal resistance of the layer. The turns ratio itself corresponds to the effective winding number of the oscillator inductance in relation to the effective winding number of the layer. Typical values lie between 10 and 1000. The fact that the effective winding number of the oscillator inductance can be set allows optimization of the measurement result, adapted to the object being measured.

In particular, a winding number of an oscillator inductance is adapted to the material and the thickness range of the layer.

It is most particularly advantageous if the oscillator of an inductive proximity sensor is operated in an evaluating quality circuit (Q circuit), in which the presence of an object being measured brings about damping of the oscillator. This damping has the effect of extracting energy from the alternating electromagnetic field which is generated by the oscillator and, as a result, of reducing the height of the oscillation amplitude (the Q factor of the oscillator is reduced). With the inductive proximity sensor connected up in such a way, good measurement results have been obtained with respect to the layer thickness determination. In particular, the oscillator amplitude is then measured to allow the layer thickness to be ascertained.

Furthermore, it is particularly advantageous if the oscillator of an inductive proximity sensor is operated in resonance, that is to say a measuring coil operates at resonance as part of the oscillator and frequency-determining element. It then does not have to be excited with an outside frequency, so that a corresponding inductive proximity sensor can be produced at low cost.

It is most particularly advantageous furthermore if the inductive proximity sensor detects the layer to be measured without contact. As a result, the measurement result can be obtained in a quick and uncomplicated way, since the measurement can be carried out at a distance from the layer. Furthermore, a layer thickness measurement can then also be carried out at any time during the processing of the layer, provided that the corresponding processing tool does not modify the alternating electromagnetic field which is emitted by the inductive proximity sensor. Detection without contact also makes it possible for the object being measured and the inductive proximity sensor to be positioned completely as desired with respect to each other. As a result, every point of the layer can be measured in a simple way.

It is advantageous that a shielding which is substantially permeable to electromagnetic fields is disposed between an inductive proximity sensor and the layer to be measured. By means of this shielding, which comprises a glass plate for example, the inductive proximity sensor can be mechanically shielded, for example from a working tool for working on the layer.

Furthermore, it is advantageous if at least two inductive proximity sensors are provided, in order to allow a differential measurement to be carried out. For example, two inductive proximity sensors may be disposed with respect to the layer with a lateral spacing between them. A planarity measurement can then be carried out with respect to the layer. Such a differential measurement can also serve the purpose of keeping constant, or checking for constancy, the distance between one or more inductive proximity sensors and a support which carries the layer. A differential measurement also allows a temperature equalization to be achieved, so that in particular the influence of local temperature effects on the layer thickness determination is minimized.

It is then advantageous if the inductive proximity sensors are disposed at different distances from the layer to be measured. In this way, the effect on the determination of the layer thickness of any possible dependence on the distance of an active surface of an inductive proximity sensor from the layer can be eliminated.

In an advantageous embodiment, a plurality of inductive proximity sensors are combined in a row or an array, so that the layer thickness can be determined for a region of the surface area of the layer. A sensor head, which has such a row of proximity sensors or such an array of proximity sensors, can be positioned over the layer and the layer thickness can then be determined over the surface area of the array. This makes it possible to minimize the processes for positioning an object being measured with respect to the sensor device.

In particular, in this case the inductive proximity sensors are then able to be connected up sequentially, in order to minimize the mutual influence of neighboring proximity sensors in particular on one another, which could falsify the measurement results.

It is also advantageous if signal evaluation electronics are integrated into an inductive proximity sensor, so that the signal emitted by an inductive proximity sensor already contains the complete information on the layer thickness. This signal can then be used directly by a control device, in order for example to carry out control processes.

The invention also relates to the use of an inductive proximity sensor with an oscillator for determining the layer thickness of thin layers of an electrically conducting or semiconducting material.

The advantages of such a use have already been explained in connection with the sensor device according to the invention.

Further advantageous refinements of this use have already been explained in connection with the sensor device according to the invention.

In particular, it is advantageous if the oscillator is operated in resonance and a change in quality, manifested for example by a change in amplitude of the oscillator, is ascertained.

The invention also relates to a method for determining the layer thickness of a thin layer of an electrically conducting or semiconducting material.

According to the invention, in this case one or more inductive proximity sensors, each with an oscillator, are positioned at a distance from the layer, the frequency of an oscillator having been adapted or being adapted to the material and the thickness range of the layer to be measured.

The advantages of the method according to the invention have already been explained in connection with the sensor device according to the invention.

Further advantageous refinements of the method according to the invention have likewise already been explained in connection with the sensor device according to the invention.

In particular, it is advantageous if the layer thickness is ascertained without contact.

It may be provided in this case that processing of the layer is carried out by means of a processing tool, which is positioned in the intermediate region between the inductive proximity sensor or sensors and the layer. Such an intermediate space is available, since the layer thickness is ascertained without contact.

It is advantageous in this case if the inductive proximity sensor or sensors is or are mechanically shielded from the processing tool by a shielding permeable to the alternating electromagnetic field of the inductive proximity sensor. This prevents mechanical influencing, which could for example disturb an adjustment of the inductive proximity sensor.

It is then also advantageous if the processing of the layer is controlled by means of the measurement results of the inductive proximity sensor or sensors. Since the layer thickness can be ascertained without contact by means of an inductive proximity sensor, the corresponding layer thicknesses can consequently be ascertained "online". As a result, it is possible to convert the ascertained results directly, in order to control the processing of the layer.

It is also advantageous if an effective winding number of an oscillator inductance has been or is adapted to the material of the layer and to the layer thickness range. This allows optimum measuring accuracy and measuring resolution to be achieved.

The description which follows of preferred embodiments serves together with the drawing for a more detailed explanation of the invention.

DETAILED DESCRIPTION OF THE INVENTION

Figure 1:
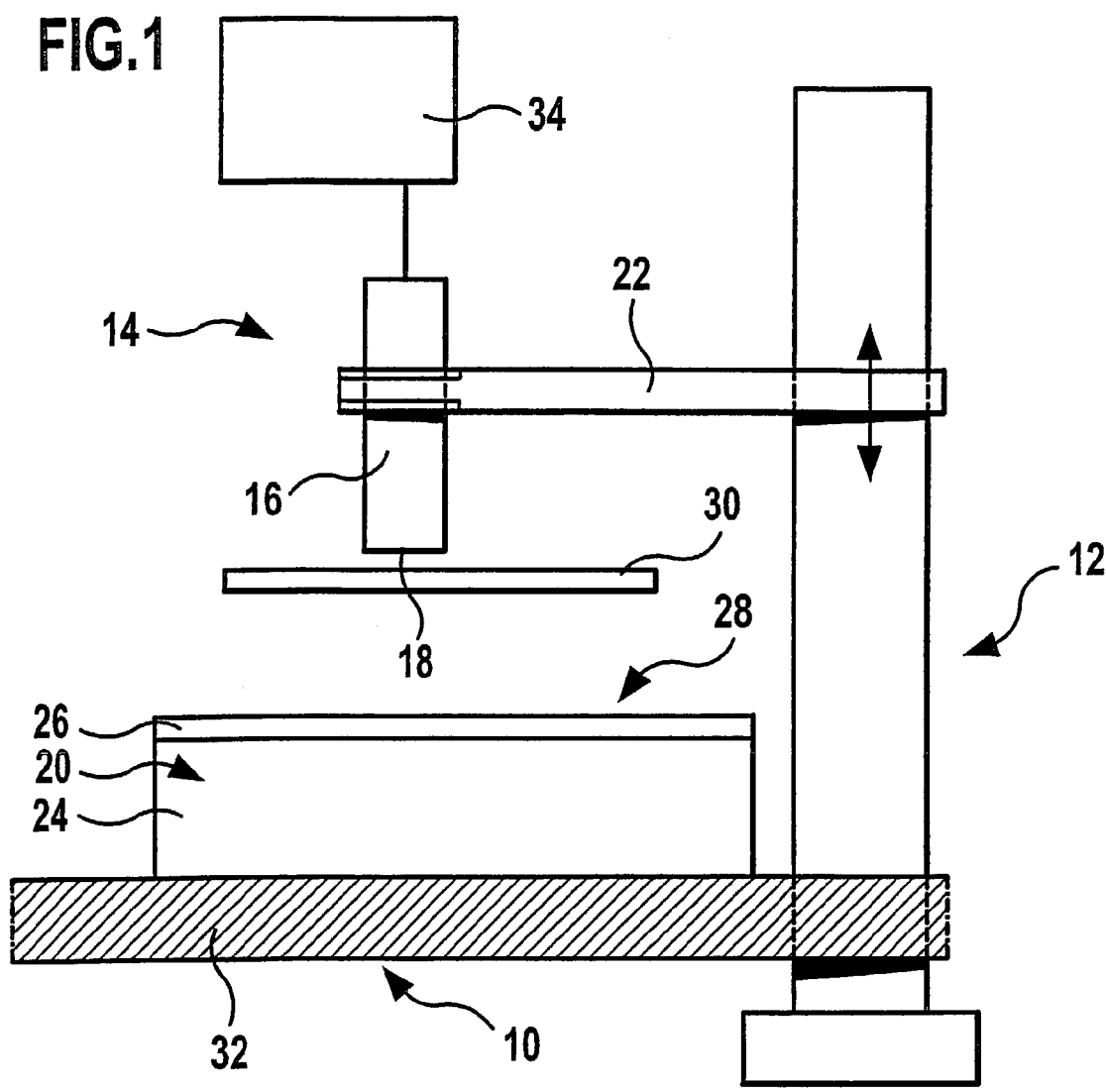
FIG. 1 shows a schematic representation of a sensor device for determining the thickness of a layer on a support.

An exemplary embodiment of a sensor device according to the invention, which is designated in FIG. 1 as a whole by 10, comprises a stationary holding device 12, which holds a sensor head 14. In the exemplary embodiment shown in FIG. 1, the sensor head 14 comprises an inductive proximity sensor 16 with an active surface area 18, which is positioned at a distance from an object being measured 20.

The inductive proximity sensor 16 is displaceable in height with respect to the object being measured 20, for example by means of a holding arm 22, it being possible for every vertical position to be fixed.

The object being measured 20 comprises a support 24, on which a thin electrically conducting layer, in particular a metallic layer 26, is disposed. The layer thickness of this thin layer is in this case of the order of magnitude of μm, for example between 0.005 μm and 2 μm. In particular, the support 24 is a non-conducting material, such as for example a silicon wafer, with a copper layer disposed on it as layer 26.

The active surface area 18 of the inductive proximity sensor 16 faces towards the layer 26. In this case there is an intermediate space 28 between the active surface area 18 and the layer 26. For example, it may be provided that the layer 26 is worked on, for example polished or lapped, via this intermediate space by means of a working tool. If the working tool is produced from an electrically non-conducting material, so that it is permeable to electromagnetic fields and does not modify the electromagnetic waves emitted by the inductive proximity sensor 16, the thickness of the layer 26 can be measured "online" even during the processing.

It may also be provided that the support 24 faces towards the active surface area 18 and the layer 26 faces away from the active surface area 18. The field emitted by the inductive proximity sensor 16 then penetrates through the support 24 before it interacts with the layer 26.

It may be provided that a shielding 30, which is likewise produced from an electrically non-conducting material, is disposed in front of the sensor head 14, facing the layer 26. This shielding serves for the mechanical protection of the inductive proximity sensor 16 with its active surface area 18. For example, this shielding 30 may be a glass plate.

It may also be provided in this case that the object being measured 20 is itself moved through a measuring field, for example by means of a conveyor belt 32, on which the object being measured is disposed. As a result, a region of the surface area of the layer 26 can be scanned along the direction of movement by the inductive proximity sensor 16.

A control device 34, which is connected to the inductive proximity sensor 16 and a control unit for the processing tool, may also be provided. The processing tool can then be controlled by means of this control device 34 in dependence on the ascertained layer thickness of the layer 26.

This control device 34 may also comprise an evaluating device for the ascertained measurement results, and a display and output device.

Figure 2:
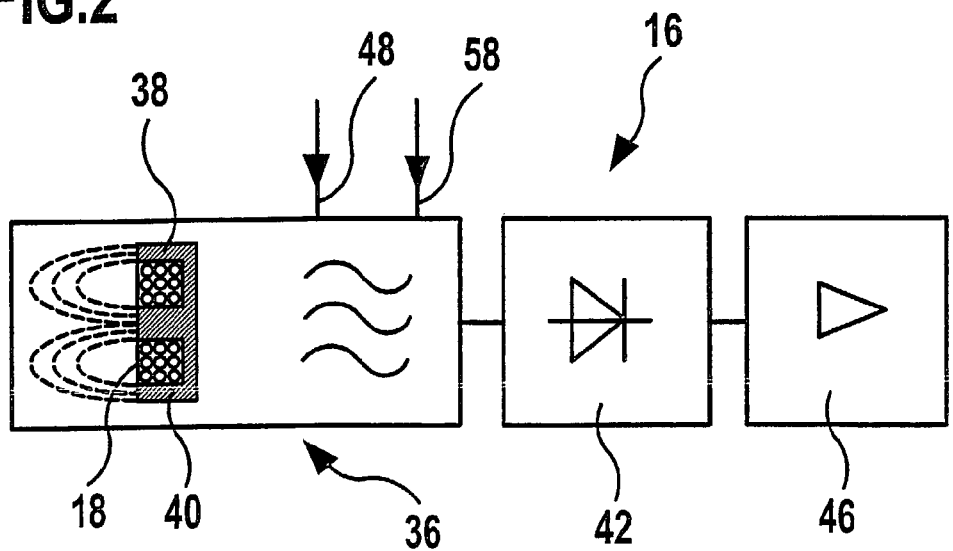
FIG. 2 schematically shows the structure of an inductive proximity sensor, with which a layer thickness can be ascertained.

As schematically shown in FIG. 2, the inductive proximity sensor comprises an oscillator 36 with a measuring coil 38 as an oscillator inductance. (The oscillator 36 may also comprise further inductances. For the sake of simplicity, it is assumed that the oscillator inductance is largely determined by the measuring coil 38). This measuring coil 38 has a coil core 40, for example a ferrite core.

An alternating electromagnetic field is directed via the active surface area 18 onto the object being measured 20 with, for example, a metallic conductor (the layer 26). In the layer 26 as metallic damping material, eddy currents are induced and extract energy from the field. As a result, the oscillation amplitude in the oscillator 36 is reduced, since the latter is damped; the Q factor is reduced. This change is evaluated in the inductive proximity sensor 16.

For this purpose, a demodulator 42 and an output driver 46 are provided. The corresponding electronics for the evaluation of the oscillation amplitude and derivation of a corresponding signal, which then contains information on the layer thickness of the layer 26, are preferably integrated into a housing of the inductive proximity sensor 16.

The frequency of the oscillator 36 is set such that it is adapted to the material of the layer 26 and to the expected layer thickness range in such a way that optimum measurement results can be achieved. A criterion for the setting of the frequency is based on the penetration depth (skin depth) of the alternating electromagnetic field into the layer 26.

The penetration depth or skin depth δ in the case of a metal is determined by $$\delta = \sqrt{\frac{1}{f \pi \sigma \mu \mu_o}}$$

with the magnetic permeability μ of the material of the layer 26 and the electrical conductivity δ of the material; f is the frequency and $\mu_o$ is the space permeability.

For copper, at a frequency of f=1 MHz, the penetration depth δ is, for example, about 70 μm.

If the frequency is chosen too high, the alternating electromagnetic field can penetrate only into a partial region of the layer 26, so that the layer thickness cannot be determined. If the frequency is chosen too low, on the one hand the measuring resolution is too low and on the other hand extraneous objects outside the layer 26 can also be sensed by the alternating electromagnetic field, since the penetration depth δ is then too great, so that the measurement result would then be falsified.

On the basis of the relationship stated above, the frequency is consequently set such that it is adapted to the material of the layer 26 and to the layer thickness range, in order to obtain an optimum measurement result. In particular, the frequency of the oscillator 36 in this case lies in the range between about 10 kHz and 100 MHz.

It has been possible to achieve good results for copper layers in a thickness range between, for example, 0.005 μm and 2 μm if a frequency of 1 MHz was used.

It may in this case be provided in particular that the frequency of the oscillator 36, as indicated in FIG. 2 by the arrow with reference numeral 48, can be adjusted externally, in order in this way to be able to adapt it to the inductive proximity sensor 16. During the measurement itself, the frequency is fixed.

Figure 3:
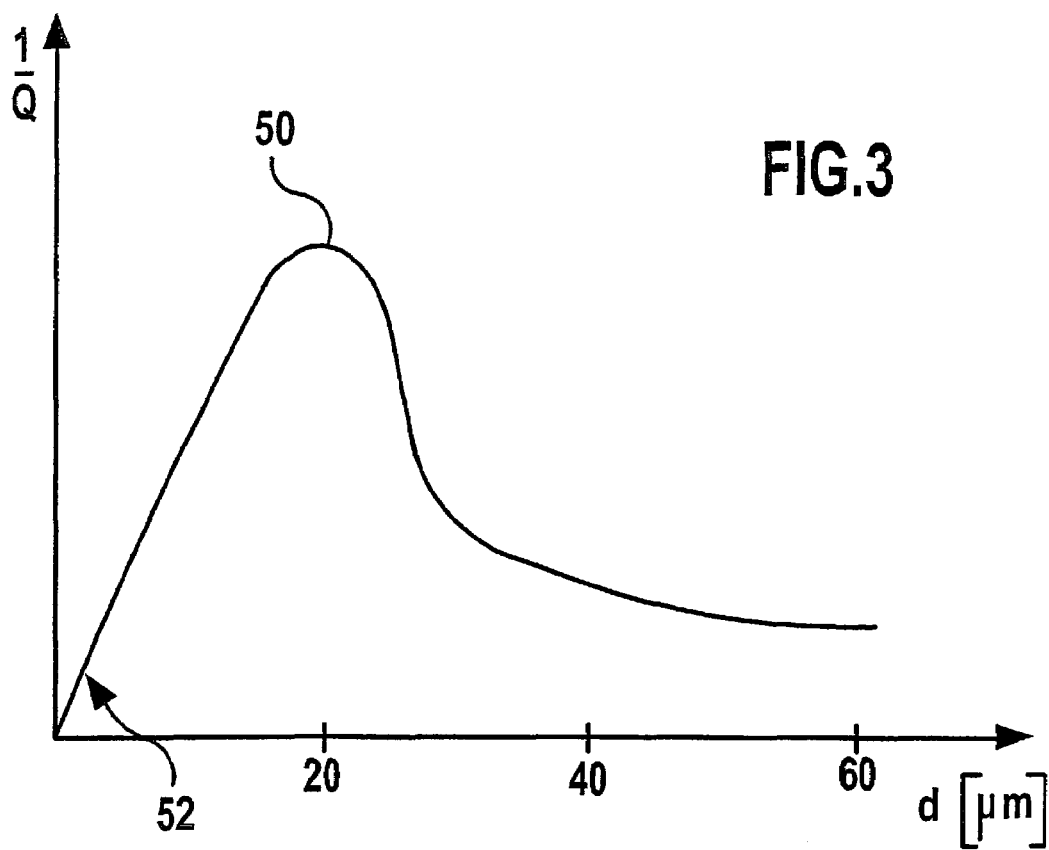
FIG. 3 schematically shows the profile of the change in Q factor of an oscillator of the inductive proximity sensor according to FIG. 2 in dependence on a layer thickness d when the proximity sensor is positioned at a distance from this layer.

FIG. 3 schematically shows the measurement result 1/Q of the reciprocal of the quality factor Q in dependence on the layer thickness d of a copper layer 26 on an electrically non-conducting support (film effect). It can be seen that, in the case of small layer thicknesses below a maximum 50, this reciprocal increases in an approximately linear form from the layer thickness of zero to this maximum 50 (it is evident from the algebraic sign that this is a decrease in Q factor, since greater damping occurs with greater layer thickness). This change in Q factor is manifested in the evaluation of the amplitude of the oscillations of the oscillator 36 in a decrease in amplitude. Consequently, the layer thickness d of the layer 26 can be determined from the signal amplitude of the oscillator 36, it also being possible in particular to measure layer thicknesses in the magnitude range of 1 μm or less with good resolution.

The relevant measuring range for determining the layer thickness of thin layers 26 with the changes in Q factor in FIG. 3 lies in the range 52 below the maximum 50.

The oscillator 36 is preferably operated in resonance, the measuring coil 38 being the frequency-determining element of the oscillator 36. By disposing the inductance 38 in such a resonant circuit, it then does not have to be excited by an outside frequency.

Figure 4:
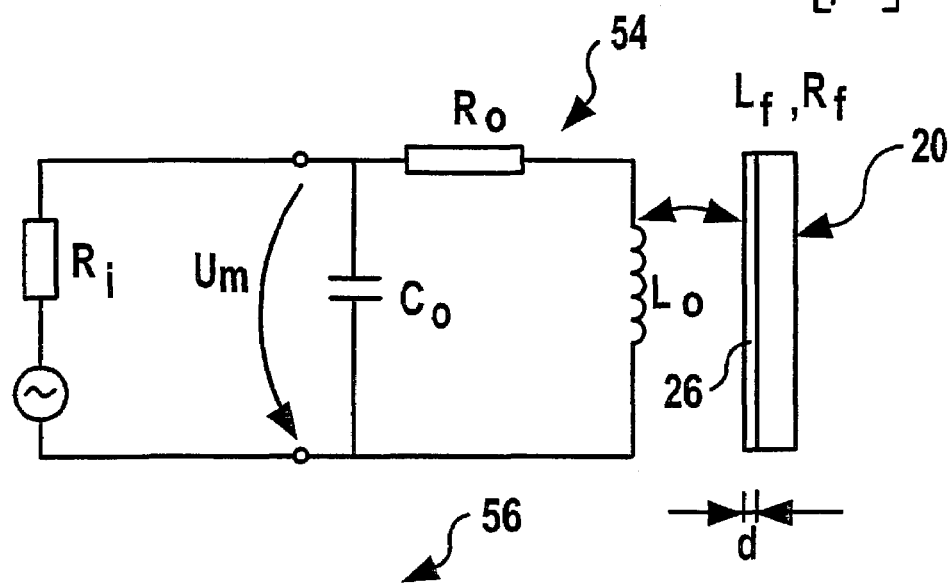
FIG. 4 shows a simplified diagram of an oscillator which is positioned with an active surface area at a distance from a support with a metallic layer.

FIG. 4 schematically shows an equivalent circuit diagram of the oscillator 36 with the object being measured 20. This resonant circuit 54 comprises the inductance $L_o$ (measuring coil 38), a capacitance $C_o$ and a resistor $R_o$ in the resonant circuit. The circuit further comprises an internal resistance $R_I$. A voltage $U_m$, which drops across the capacitance $C_o$, represents the signal voltage (before demodulation).

Figure 5:
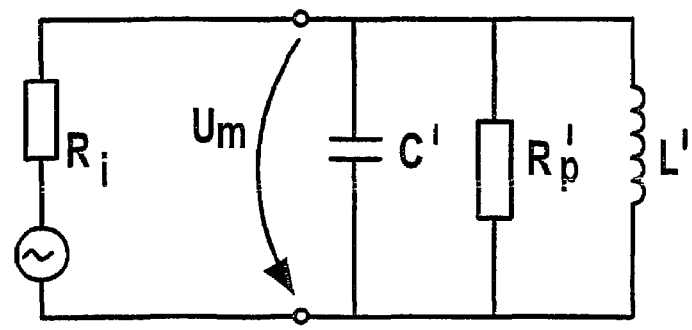
FIG. 5 shows an equivalent circuit diagram of the arrangement according to FIG. 4.

The inducing of eddy currents in the layer 26 on the basis of the interaction with the alternating electromagnetic field means that this coupling can be understood as a mutually inductive coupling and the overall arrangement can be represented in a schematic equivalent circuit diagram 56, which is shown in FIG. 5. The coupling of the layer 26 has the effect in this case that the capacitance is modified into an equivalent capacitance C', the inductance is modified into an inductance L' and, furthermore, the influence of the layer 26 can be sensed by a resistor $R_p'$ connected in parallel with the inductance L'.

An internal resistance $R_f$ and an inductance $L_f$ can be associated with the layer 26. This internal resistance $R_f$ and possibly also $L_f$ are dependent on the thickness d of the layer 26.

In resonance operation, the impedance is real, that is to say there is no phase shift between current and voltage. Furthermore, it can be assumed with very good approximation that the modification of $C_o$ into C' and, in first approximation, the modification of $L_o$ into L' are negligible on account of the layer 26, that is say the main effect of the presence of the layer 26 is manifested in the parallel equivalent resistance $R_p'$. The magnitude of the equivalent resistance $R_p'$ in this case depends on the layer thickness of the layer 26. This equivalent resistance is in this case determined approximately by $$R_p' = \frac{1}{R_o + n^2 \cdot R_f} \frac{L'}{C_o},$$

provided that there is resonance, n being the turns ratio of the winding number of the inductance $L_o$ in relation to the winding number of the inductance $L_f$ of the layer 26. Typical values for n are of the order of magnitude of 10 to 1000, it also being possible for n to be dependent on the layer thickness.

Since the measuring voltage $U_m$ is directly proportional to $R_p'$, the measuring voltage of the oscillator 36 consequently depends on the layer thickness; for example, in crude approximation $R_f$ is inversely proportional to the square of the thickness and, provided that $R_o$ is negligible with respect to $n^2 \cdot R_f$, $U_m$ is then approximately proportional to the square of the layer thickness. (However, in this approximation, the layer 26 was assumed to be annular, which under some circumstances represents an excessively broad approximation).

A power matching can be carried out by means of the turns ratio or transformation ratio n, so that a measurement can be optimized in particular by means of adjusting the effective winding (number of turns per unit length) of the measuring coil 38. For this purpose, as indicated in FIG. 2 by the reference numeral 58, it is provided in a variant of an embodiment that the effective winding number of the measuring coil 38 can be set externally. This setting takes place before the measurement; during the measurement, the effective winding number of the measuring coil 38 is constant. The setting is once again carried out in such a way that an optimum measurement result is obtained.

The frequency can be varied by means of the frequency setting 48 in such a way that $L_o$ and/or $C_o$ is/are varied. By changing the effective winding number of the inductance 38, the frequency is likewise changed, and also the ratio n. In particular, the capacitance $C_o$ can be switched over, in order to set the frequency of the oscillator 36.

Figure 6:
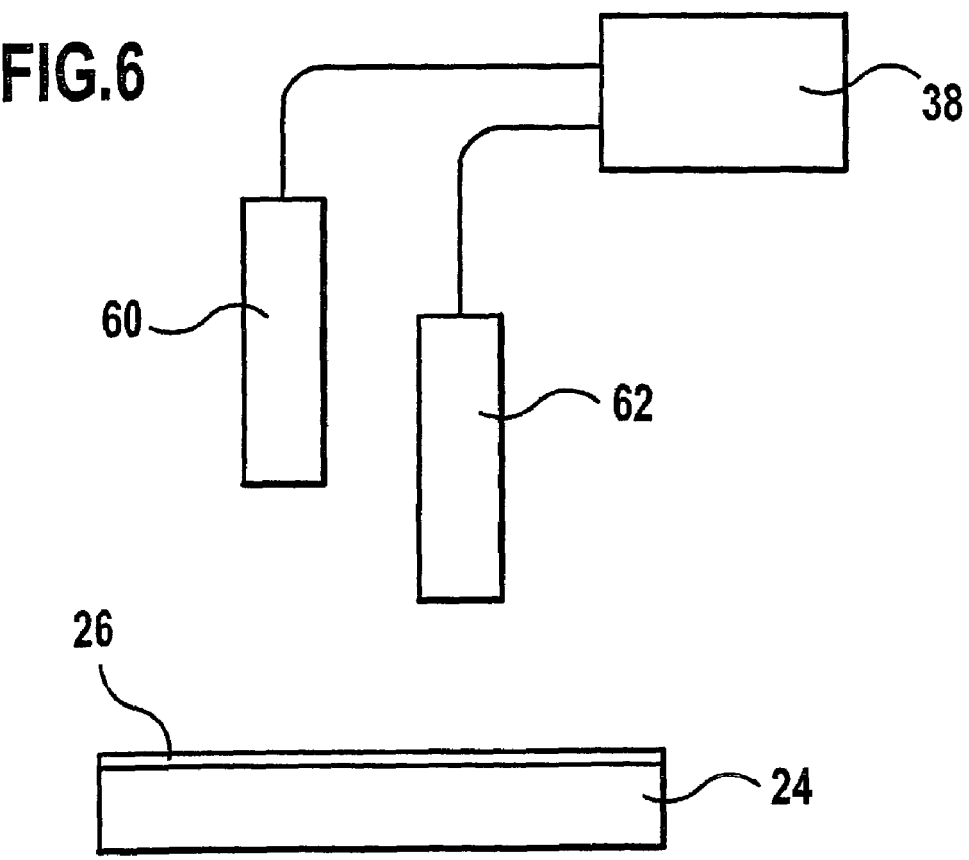
FIG. 6 shows a schematic representation of a further exemplary embodiment of a sensor device with two inductive proximity sensors for differential measurement.

The sensor head 14 may also be formed in such a way that it comprises a plurality of inductive proximity sensors. This is schematically indicated in FIG. 6, with a first inductive proximity sensor 60 and a second inductive proximity sensor 62 being provided. Both proximity sensors 60 and 62 are in this case connected in particular to the control device 34.

The provision of two inductive proximity sensors 60 and 62 allows a differential measurement to be carried out. For example, it allows the layer thickness of the layer 26 to be determined simultaneously at two different measuring points and, as a result, the planarity of the layer to be determined.

It may also be provided that the two inductive proximity sensors 60, 62 are used to verify the opposing measurement results. For example, one proximity sensor then measures the distance from the layer 26, while it is the task of the other proximity sensor to determine the layer thickness of the layer 26. In particular, the two inductive proximity sensors 60, 62 are in this case mounted at different distances with respect to the layer 26.

Figure 7:
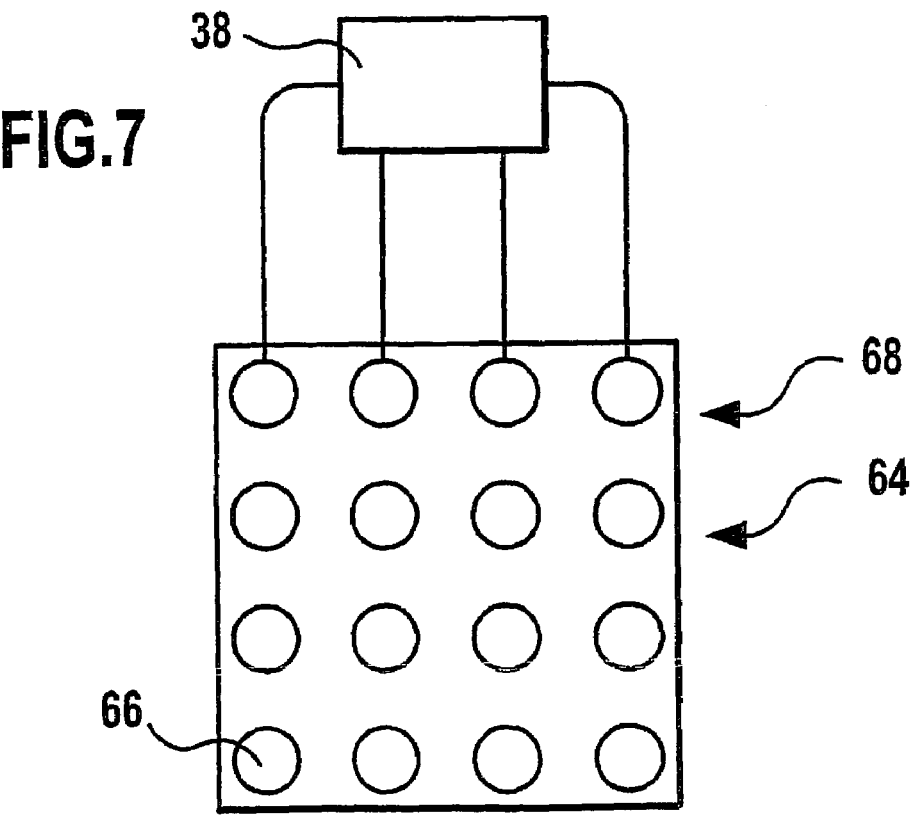
FIG. 7 shows a further exemplary embodiment of a sensor device according to the invention with an array of inductive proximity sensors.

It may also be provided, as shown by way of example in FIG. 7, that the sensor head 14 comprises an array 64 of inductive proximity sensors 66 which are disposed in rows and/or columns. If such a sensor head 68 is positioned over the layer 26, the thickness of the layer 26 can be determined simultaneously at different points over a large region of the surface area.

It may be provided in this case that the individual inductive proximity sensors 66 of the array 64 are selectively switched, so that they do not influence one another during the measurement, and consequently a falsification of the measurement result on account of proximity sensor/proximity sensor interaction is avoided.

It has been found that an inductive proximity sensor which has an oscillator 36 operated in resonance and is operated in an evaluating quality circuit, that is to say the signal amplitude of which is evaluated, delivers good measurement results, with which the layer thicknesses of, for example, metallic layers 26 can be evaluated. The measurement takes place in this case without contact, that is to say the active surface area 18 of the inductive proximity sensor 16 is disposed at a distance from the layer 26. By appropriate choice of the frequency of the oscillator 36, and possibly appropriate choice of the effective number of turns per unit length of the inductance 38, a measurement result of good accuracy can be obtained, so that layer thicknesses of the order of magnitude of μm or less can also be determined.

The measurement results can in this case also be obtained during the processing of the layer 26, if the processing tool is produced from an electrically non-conducting material and the distance of the active surface area 18 of the inductive proximity sensor 16 from the support 24 of the layer 26 remains constant.

It is also possible to measure layer thicknesses in the case of layers of a semiconducting material, if the latter is adequately doped. The measurement is in this case an effective resistance measurement—without contact—, since the internal resistance $R_f$ of the layer 26 is ascertained by means of the inductive proximity sensor or sensors. With a known thickness of the layer 26 and a known distance, this allows the conductivity, and consequently the doping factor, of the layer to be determined.

The invention claimed is:

1. Sensor device for measuring the layer thickness of a thin layer, comprising:
    an inductive proximity sensor which is positionable at a distance from the thin layer to be measured;
    wherein:
    the thin layer the thickness of which is to be measured is of an electrically conducting or semiconducting material and is arranged on a non-conducting carrier;
    the inductive proximity sensor comprises an oscillator with a frequency which is set in dependence on the material and the thickness range of the thin layer to be measured, and
    said frequency is at most as high as a frequency at which the electromagnetic field generated by the oscillator is able to substantially penetrate the thin layer to be measured.

2. Sensor device according to claim 1, wherein:
the distance from a support for the thin layer is kept constant during the measurement.

3. Sensor device according to claim 1, wherein:
the frequency of the oscillator or oscillators is kept constant during the measurement.

4. Sensor device according to claim 1, wherein:
the frequency of the oscillator is at most as high as a frequency at which the electromagnetic penetration depth corresponds to about ⅓ of the layer thickness.

5. Sensor device according to claim 1, wherein:
the frequency of the oscillator is at least high enough for good measuring sensitivity to be obtained.

6. Sensor device according to claim 1, wherein:
the frequency of the oscillator is at least high enough for an influence of surroundings of the thin layer on a measurement result to be minimized.

7. Sensor device according to claim 1, wherein:
the frequency of the oscillator lies in the range between 10 kHz and 100 MHz.

8. Sensor device according to claim 1, wherein:
the inductive proximity sensor is formed in such a way that its frequency is adjustable.

9. Sensor device according to claim 8, wherein:
the frequency can be set by switching over or setting an oscillator capacitance.

10. Sensor device according to claim 1, wherein:
the inductive proximity sensor is formed in such a way that an effective winding number of an oscillator inductance is adjustable.

11. Sensor device according to claim 1, wherein:
an effective winding number of an oscillator inductance is dependent on the material and the thickness range of the thin layer.

12. Sensor device according to claim 1, wherein:
the oscillator of the inductive proximity sensor is operated in a quality circuit, in which a presence of an object being measured brings about damping of the oscillator.

13. Sensor device according to claim 12, wherein:
an oscillator amplitude is evaluated.

14. Sensor device according to claim 1, wherein:
the oscillator of the inductive proximity sensor is operated in resonance.

15. Sensor device according to claim 1, wherein:
the inductive proximity sensor detects the thin layer to be measured contact-free.

16. Sensor device according to claim 1, wherein:
a shielding which is substantially permeable to electromagnetic fields is disposed between the inductive proximity sensor and the thin layer to be measured.

17. Sensor device according to claim 1, wherein:
at least two inductive proximity sensors are provided, each proximity sensor measuring a layer thickness at a respective measuring point.

18. Sensor device according to claim 17, wherein:
the inductive proximity sensors are positionable at different distances from the thin layer to be measured.

19. Sensor device according to claim 1, wherein:
a plurality of inductive proximity sensors are combined in a row or an array, so that the layer thicknesses can be measured for a region of the surface area of the thin layer; and
each proximity sensor measures a layer thickness at a respective measuring point in said region.

20. Sensor device according to claim 19, wherein:
the inductive proximity sensors are operatable sequentially.

21. Sensor device according to claim 1, wherein:
signal evaluation electronics are integrated into the inductive proximity sensor.

22. Sensor device according to claim 1, wherein:
the thin layer is a metallic layer.

23. Sensor device according to claim 1, wherein:
the thin layer is a layer of a semiconductor material.

24. Use of an inductive proximity sensor with an oscillator for measuring the layer thickness of thin layers, wherein:
the thin layer the thickness of which is to be measured is of an electrically conducting or semiconducting material and is arranged on a non-conducting carrier;
said inductive proximity sensor is positionable at a distance from the thin layer to be measured;
a frequency of the oscillator set in dependence on the material and the thickness range of the thin layer to be measured; and
said frequency is at most as high as a frequency at which the electromagnetic field generated by the oscillator is able to substantially penetrate the thin layer to be measured.

25. Use according to claim 24, wherein:
the oscillator is operated in resonance.

26. Use according to claim 24, wherein:
a change in quality of the oscillator is ascertained.

27. Method for measuring the layer thickness of a thin layer, comprising the steps:
positioning an inductive proximity sensor with an oscillator, at a distance from the thin layer to be measured; and
setting a frequency of the oscillator in dependence on the material and the thickness range of the thin layer to be measured;
wherein:
the thin layer the thickness of which is to be measured is of an electrically conducting or semiconducting material and is arranged on a non-conducting carrier; and
said frequency is at most as high as a frequency at which the electromagnetic field generated by the oscillator is able to substantially penetrate the thin layer to be measured.

28. Method according to claim 27, wherein:
the layer thickness is measured contact-free.

29. Method according to claim 27, wherein:
processing of the thin layer is carried out by means of a processing tool, which is positioned in an intermediate region between the inductive proximity sensor and the layer.

30. Method according to claim 29, wherein:
the inductive proximity sensor is mechanically shielded from the processing tool by a shielding substantially permeable to electro-magnetic fields.

31. Method according to claim 29, wherein:
processing of the thin layer is controlled by means of measurement results of the inductive proximity sensor.

32. Method according to claim 27, wherein:
an effective winding number of an oscillator inductance is dependent on the material of the thin layer and to the layer thickness range.

* * * * *